United States Patent [19]

Foster

[11] 4,353,563
[45] Oct. 12, 1982

[54] SNOWMOBILE TOWBAR

[76] Inventor: Thomas R. Foster, 602 Water St., Warren, Ill. 61087

[21] Appl. No.: 101,893

[22] Filed: Dec. 10, 1979

[51] Int. Cl.³ .............................................. B62B 17/00
[52] U.S. Cl. .................................. 280/24; 280/491 E; 280/493
[58] Field of Search ..................... 280/24, 400, 491 R, 280/491 E, 457, 482, 493

[56] References Cited

U.S. PATENT DOCUMENTS

| | | | |
|---|---|---|---|
| 2,760,789 | 8/1956 | Wampler | 280/491 E X |
| 3,325,187 | 6/1967 | Noakes | 280/457 |
| 3,727,937 | 4/1973 | Maki | 280/24 |
| 3,741,578 | 6/1973 | Dumont | 280/24 |
| 3,762,736 | 10/1973 | Johnson et al. | 280/24 |
| 3,779,571 | 12/1973 | Ahmling | 280/24 |
| 3,797,846 | 3/1974 | Pevic | 280/24 |

FOREIGN PATENT DOCUMENTS 970410   7/1975   Canada ........................... 280/491 E Primary Examiner—Joseph F. Peters, Jr.
Assistant Examiner—Ross Weaver
Attorney, Agent, or Firm—Anthony S. Zummer

[57] ABSTRACT

This invention relates to a towbar particularly adapted for attachment to a snowmobile for towing the snowmobile. The towbar includes an elongated tubular tongue with a hitch connected to one end for releasably securing the tongue to a rear hitch on a snowmobile. An elongated tubular crossbar is fixed to the other end of the tongue. The crossbar is adapted for releasable connection to runners of a snowmobile which is to be towed. An elongated ear is connected to each end of the crossbar for holding the towbar onto the runner. Each ear has one end fixed to the crossbar and the other end spaced away from the crossbar and extending toward the other ear for receiving a portion of a runner between the ear and the crossbar for holding the runner in connection with the towbar.

9 Claims, 4 Drawing Figures

SNOWMOBILE TOWBAR

BACKGROUND OF THE INVENTION

Snowmobiles are widely used and are generally used in areas where the only means of transportation is either skies, snowshoes, or snowmobiles. As with all mechanical devices, it happens that when a snowmobile has a breakdown, it is necessary to tow the snowmobile. A convenient method of towing a snowmobile is to attach a towbar to the loops on a snowmobile runner for towing the snowmobile. Snowmobile towbars are known and such snowmobile towbars are disclosed in U.S. Pat. Nos. 3,797,846, and 3,727,937. A towbar for pulling a toboggan is shown in U.S. Pat. No. 3,741,578. It is necessary to provide a snowmobile towbar which is easy to attach to a snowmobile and is secure once it is attached. In addition, it is desirable to provide a snowmobile towbar which has a minimum of weight with a maximum of strength.

SUMMARY OF THE INVENTION

The present invention relates to an improved snowmobile towbar construction which is easy to attach to a snowmobile for towing a snowmobile. The towbar includes an elongated tubular tongue. A hitch is attached to one end of the tongue for releasably securing the tongue to a vehicle, such as a snowmobile. An elongated tubular crossbar is connected to the other end of the tongue. An elongated ear is fixed to each end of the crossbar. Each ear has one end fixed to the crossbar and the other end spaced away from the crossbar and extending toward the other ear. It is therefore a principle object of the present invention to provide a snowmobile towbar which may be readily secured to a snowmobile for towing the snowmobile.

A further object of the present invention is to provide an improved snowmobile towbar construction which is strong but has light weight.

Other objects and uses of the herein disclosed invention will become readily apparent to those skilled in the art upon perusal of the following specification in light of the accompanying drawing.

BRIEF DESCRIPTION OF THE DRAWING

FIG. 1 is a perspective view of a towbar embodying the invention shown connecting a pulling snowmobile, shown partially in dotted form, connected to a disabled snowmobile also shown in dotted for;

DESCRIPTION OF THE PREFERRED EMBODIMENT OF THE INVENTION

Figure 1:
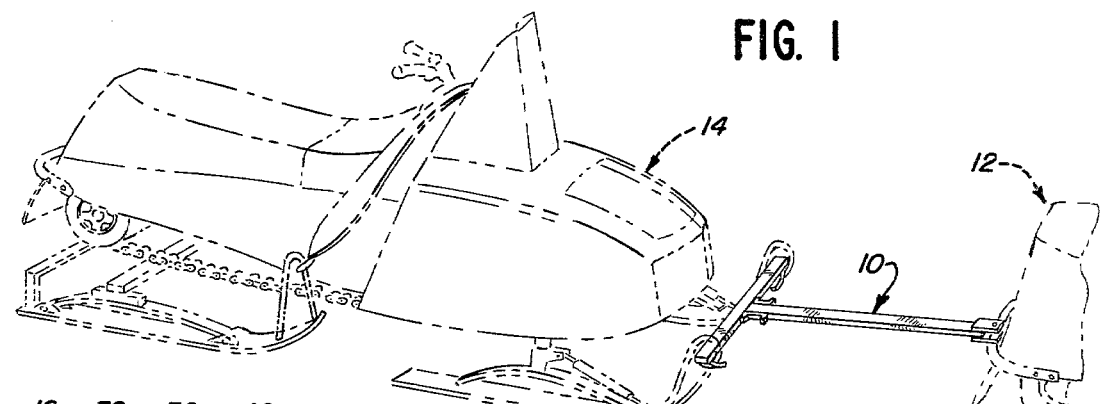
Figure 2:
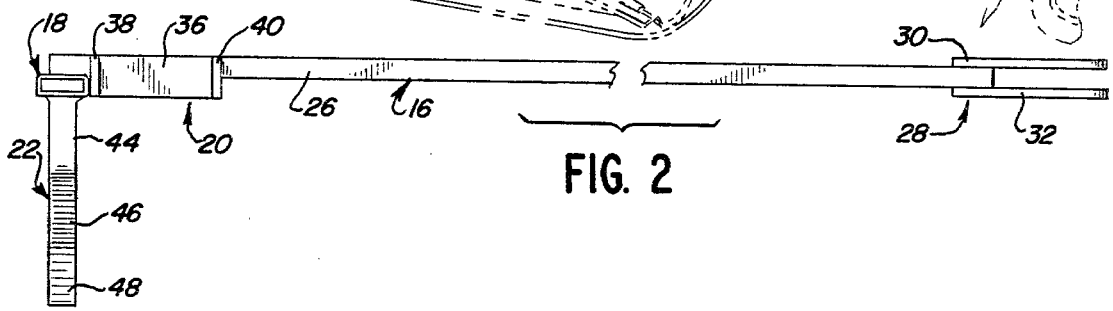
FIG. 2 is a fragmentary side elevational view of the towbar of FIG. 1.
Figure 3:
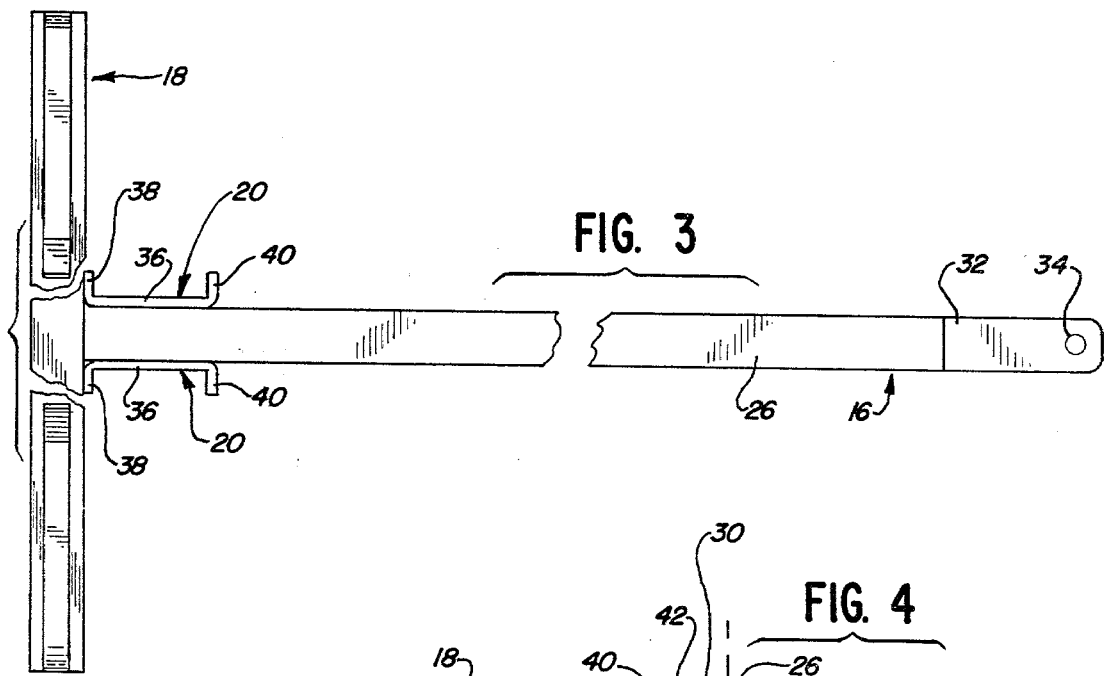
FIG. 3 is a bottom view of the towbar of FIGS. 1 and 2, but with portions of a tongue and a cross-bar broken away.

Referring now to the drawings, and especially to FIG. 1, a snowmobile towbar generally indicated by number 10 is shown attached to a towing snowmobile 12 and to a towed snowmobile 14. Towbar 10 generally includes a tongue 16 connected to a crossbar 18 by a pair of connectors 20. A pair of ears 22 and 24 is connected to opposite ends of crossbar 18.

Tongue 16 generally includes a hollow pole 26 which is an elongated piece of rectangular steel tubing. The pole has a hitch 28 fixed to one end. The hitch includes a upper plate 30 and a lower plate 32. The plates each contain a pin aperture 34 extending therethrough to allow a hitch pin to pass through apertures 34 for removably connecting the hitch to a mateable member.

Crossbar 18 is also elongated rectangular steel tubing which is connected to pole 26 by connector 20. Connector 20 includes a pair of U-shaped fasteners each having an elongated flat base 36 which is fixed to pole 26. A bar arm 38 is formed integral with one end of base 36 and is fixed to crossbar 18. A free arm 40 is formed integral with the other end of base 36. Free arm 40 includes a tie aperture 42 for receiving a tying device.

Figure 4:
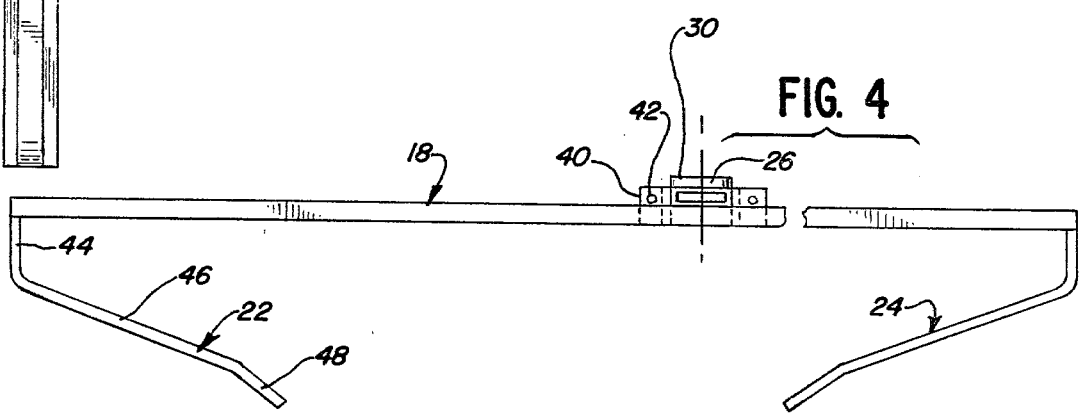
FIG. 4 is an end view of the towbar of FIGS. 1, 2 and 3 but with a portion of the crossbar broken away.

Ears 22 and 24 are identical in their construction and ear 22 is described in detail herein. Ear 22 includes a columnar base 44 which has one end fixed to crossbar 18 adjacent to one end of the crossbar. The columnar base is perpendicular to the crossbar. A leaf portion 46 is formed integral with the other end of the columnar base. The leaf portion extends toward the other ear and away from the crossbar as may be best seen in FIG. 4 so that there is an obtuse angle between the leaf portion and the columnar base. A spur 48 is formed integral with leaf portion 46 and extends toward the other ear. The spur also extends away from the crossbar but in a greater degree than the leaf portion so that there is an obtuse angle between the spur and the leaf portion on the side of the ear away from the crossbar.

Towbar 10 is used in the following matter. One of the ears and a portion of the crossbar is placed through a loop of a runner of a disabled snowmobile and the crossbar is placed on the upper portion of the runner while the ear extends below the runner. Then, the other end of the crossbar is placed through the other runner of the snowmobile so that the snowmobile runners have the crossbar resting on the runners and the ears extending below the runners. It may be appreciated that the resilience of the runners and the suspension system allows the runners to be toed in. Hitch 28 is then connected to a conventional pin hitch on a snowmobile which is to tow a disabled snowmobile. The towbar provides a means for additional securing the towbar if the disabled snowmobile is to be towed over rough terrain in that a rope or elastic belt may be connected to the tie apertures 42 of the connector and through the loops to hold the runners and tiebars relative to each other.

It may be appreciated that the towbar secures the snowmobile runners by the crossbar engaging the upper portion of the runners to tow the snowmobile. It may be further appreciated that the present construction has the tongue fixed to the crossbar in a secure connection to the disabled snowmobile so that the runners of a disabling snowmobile do not move about and have the towed snowmobile wobble as it is being towed. The connection can be made without the use of additional tools and may be made without the necessity of a snowmobiler removing his gloves or mittens when it is extremely cold. Furthermore, the lightweight construction allows the towbar to be easily handled even under the most adverse conditions.

Although a specific embodiment of the herein disclosed invention has been described in detail above, those skilled in the art may make various modifications and changes in the invention without departing from the spirit and scope of the herein disclosed invention. It is to be expressly understood that the instant invention is limited only by the appended claims.

What is claimed is:

1. A towbar for towing a snowmobile comprising: an elongated tongue, a hitch connected to one end of said tongue for releasably securing the tongue to a vehicle, an elongated crossbar connected to the other end of the tongue for engagement with skis of a towed snowmobile, and an elongated ear connected to each end of the crossbar to hold the crossbar in engagement with the skis, each of said ears having one end fixed to the crossbar and the other end spaced away from the crossbar and extending toward the other end, each of said ears being no greater distance from the hitch than the crossbar.

2. A towbar for towing snowmobile as defined in claim 1 including, a connector attached to the crossbar and to the tongue for fixedly holding the crossbar substantially perpendicular to the tongue.

3. A towbar for towing a snowmobile as defined in claim 1 wherein, each ear includes a columnar base having one end fixed to the crossbar adjacent to an end of the crossbar and being substantially perpendicular to the crossbar, a leaf portion formed integral with the columnar base and extending away from the crossbar, and a spur formed integral with the leaf portion and extending away from the crossbar.

4. A towbar for towing a snowmobile as defined in claim 1 wherein, said tongue is tubular having a rectangular cross-section.

5. A towbar for towing a snowmobile as defined in claim 1 wherein, the crossbar is tubular and has a rectangular cross-section.

6. A towbar for towing a snowmobile as defined in claim 1 including a connector fixing the crossbar to the tongue, said connector holding the crossbar substantially perpendicular to the tongue, said connector including a pair of U-shaped fasteners, each U-shaped fastener including an elongated base fixed to the tongue, a bar arm formed integal with one end of the base and fixed to the crossbar, and a free arm formed integral with the opposite end of the base and extending substantially perpendicular to the tongue, said free arm having a tie aperture.

7. A towbar for towing a snowmobile as defined in claim 1 including: a connector attached to the crossbar and to the tongue for fixedly holding the crossbar substantially perpendicular to the tongue; and each of said ears including; a columnar base having one end fixed to the crossbar adjacent to a respective end of the crossbar and being substantially perpendicular to the crossbar, a leaf portion formed integral with the columnar base and extending toward the opposite end of the crossbar and extending away from the crossbar, and a spur formed integral with the leaf portion and extending away from the crossbar and toward the opposite end of the crossbar.

8. A towbar for towing a snowmobile as defined in claim 1 including: a connector fixing the crossbar to the towbar; said connector holding the crossbar substantially perpendicular to the tongue; said connector including a pair of U-shaped fasteners; each U-shaped fastener including; an elongated base fixed to the tongue, a bar arm formed integral with one end of the base and fixed to the crossbar, and a free arm formed integral with the other end of the base and extending substantially perpendicular to the tongue, said free arm having a tie aperture; and each of said ears including; a columnar base having one end fixed to the crossbar adjacent to a respective end of the crossbar and being substantially perpendicular to the crossbar, a leaf portion formed integral with the columnar base and extending toward the other ear and away from the crossbar, and a spur formed integral with the leaf portion and extending toward the other ear and away from the crossbar.

9. A towbar for towing a snowmobile comprising: an elongated tubular tongue having a substantially rectangular cross-section, a hitch connected to one end of said tongue for releasably securing the tongue to a vehicle; a pair of U-shaped fasteners secured to the tongue adjacent to the other end thereof; each of said U-shaped fasteners including; an elongated base fixed to the tongue, a free arm formed integral with one end of its respective base and extending outward substantially perpendicular to the tongue, each of said free arms having a tie aperture, and a bar arm formed integral with the other end of respective base and being substantially perpendicular to the tongue; an elongated tubular crossbar having a rectangular cross-section fixed to the bar arms of the U-shaped fasteners and being fixedly held to the tongue substantially perpendicular to the tongue for engagement with skis of a towed snowmobile; and an elongated ear fixed to each of the opposite ends of the crossbar for holding the crossbar in engagement with the skis; each ear including; a columnar base having one end fixed to the crossbar adjacent to the respective end of the crossbar and being substantially perpendicular to the crossbar and substantially perpendicular to the tongue, a leaf portion formed integral with the opposite end of the columnar base extending toward the opposite end of the crossbar and away from the crossbar, and a spur formed integral with the leaf portion and extending toward the opposite end of the crossbar and away from the crossbar a greater amount than the leaf portion.

* * * * *